April 25, 1950     O. J. WOLFF     2,505,453
WOOL SACKER
Filed March 28, 1946     6 Sheets-Sheet 6
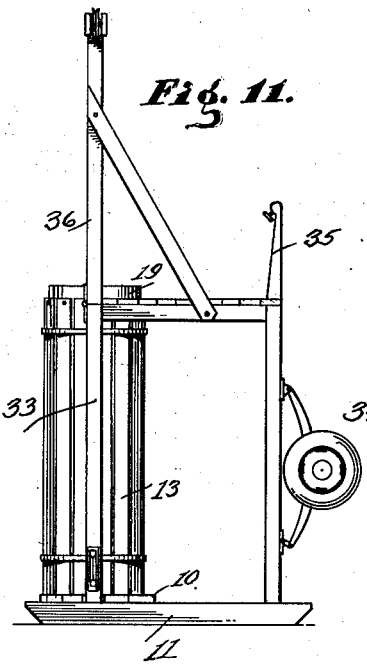
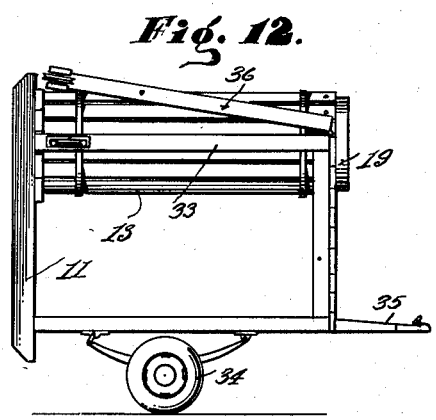
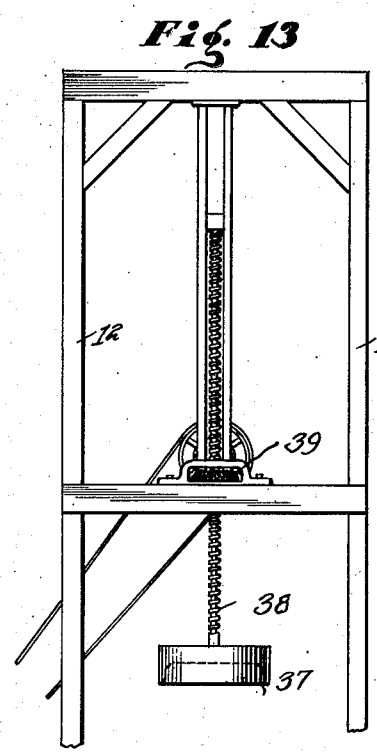
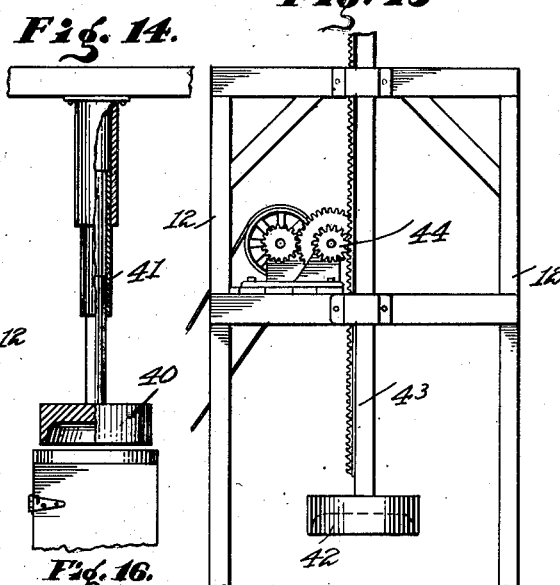
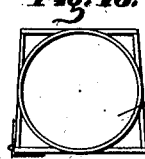
INVENTOR.
Otto J. Wolff
BY Victor J. Evans & Co.
ATTORNEYS Patented Apr. 25, 1950

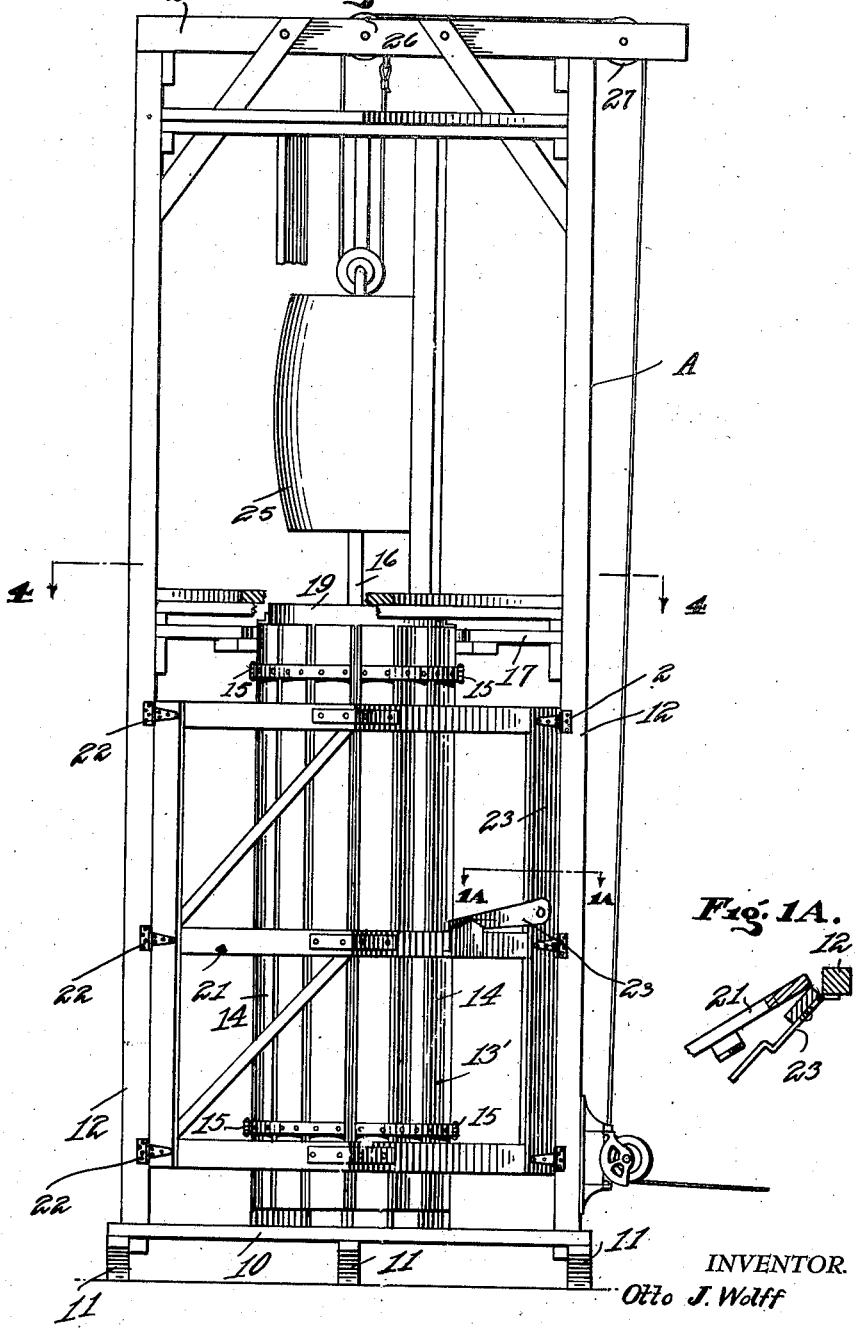

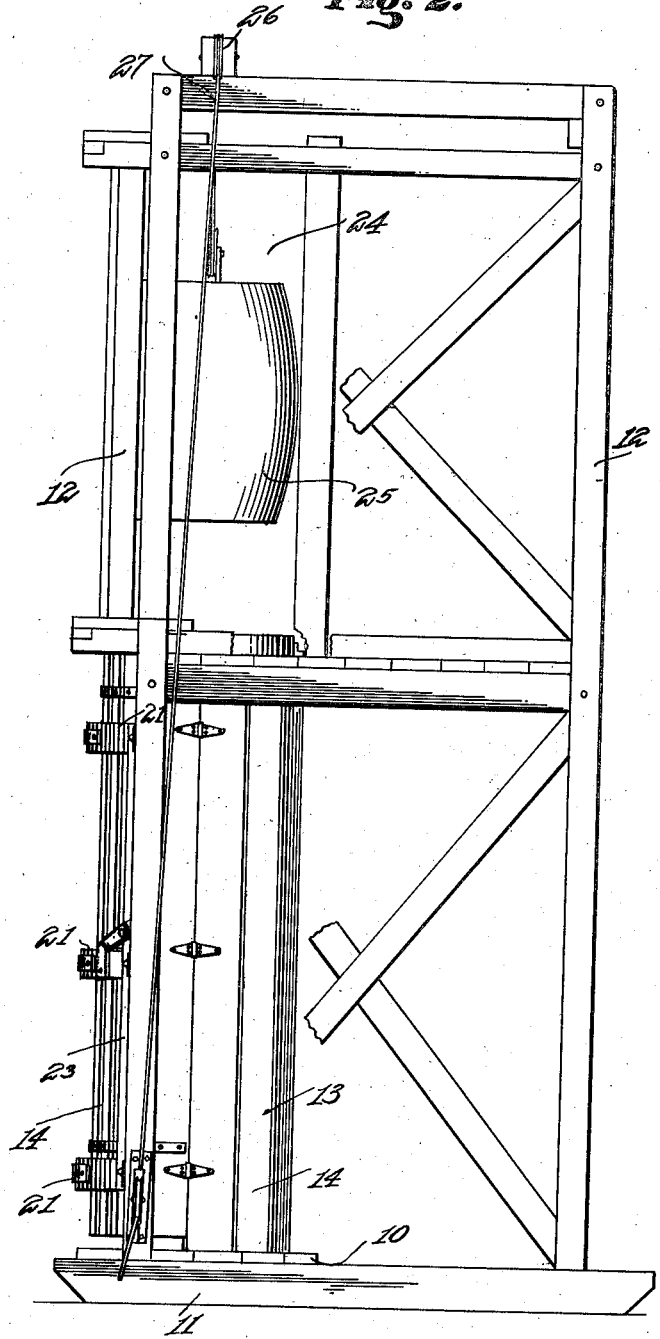

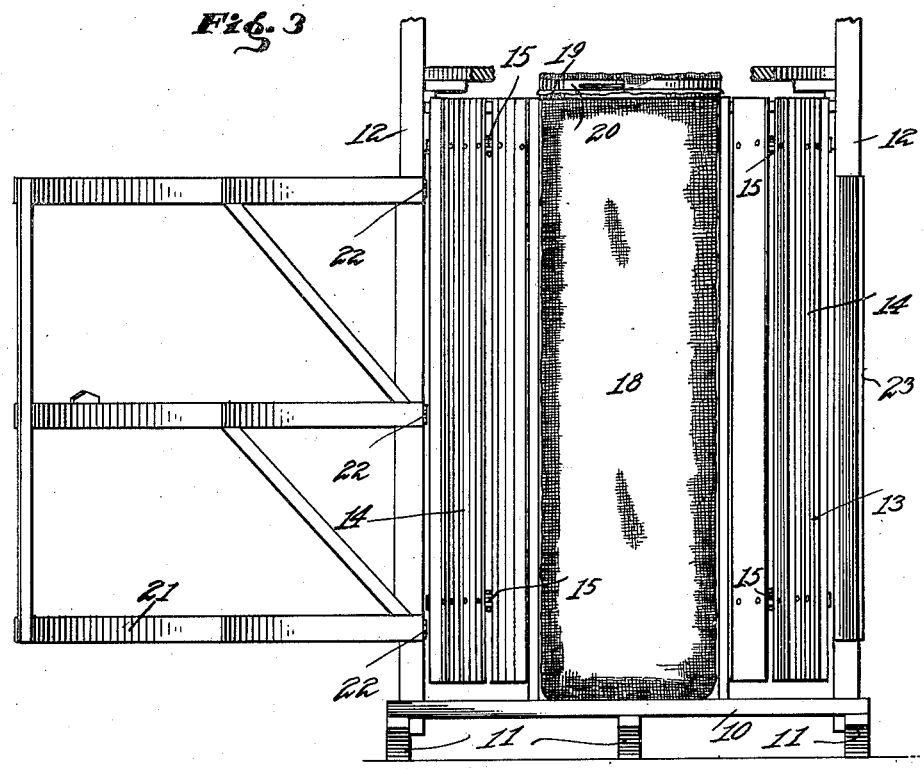
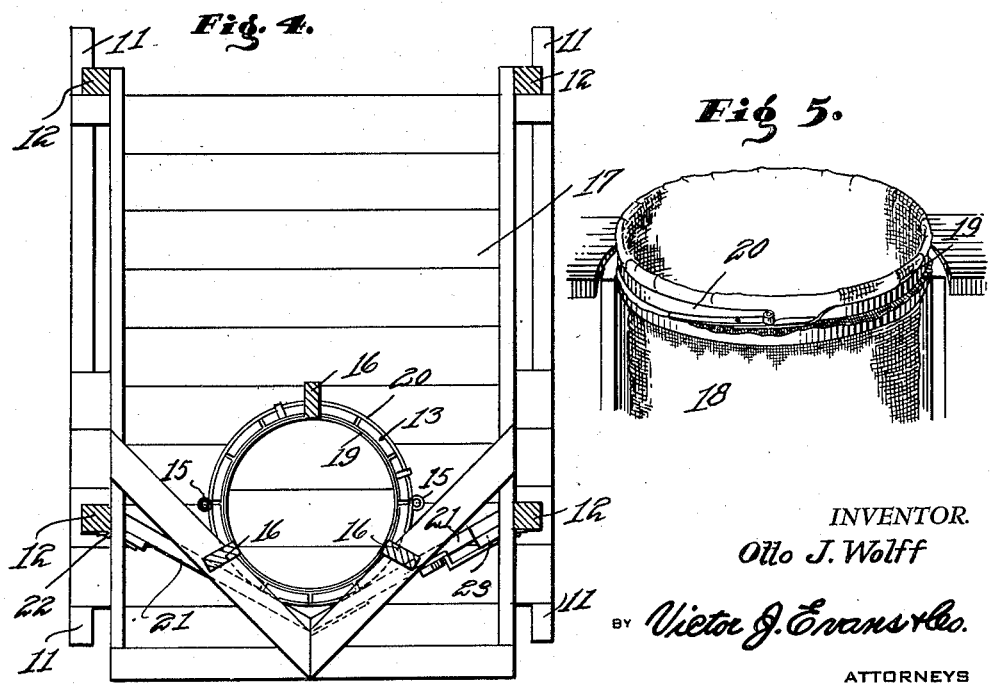

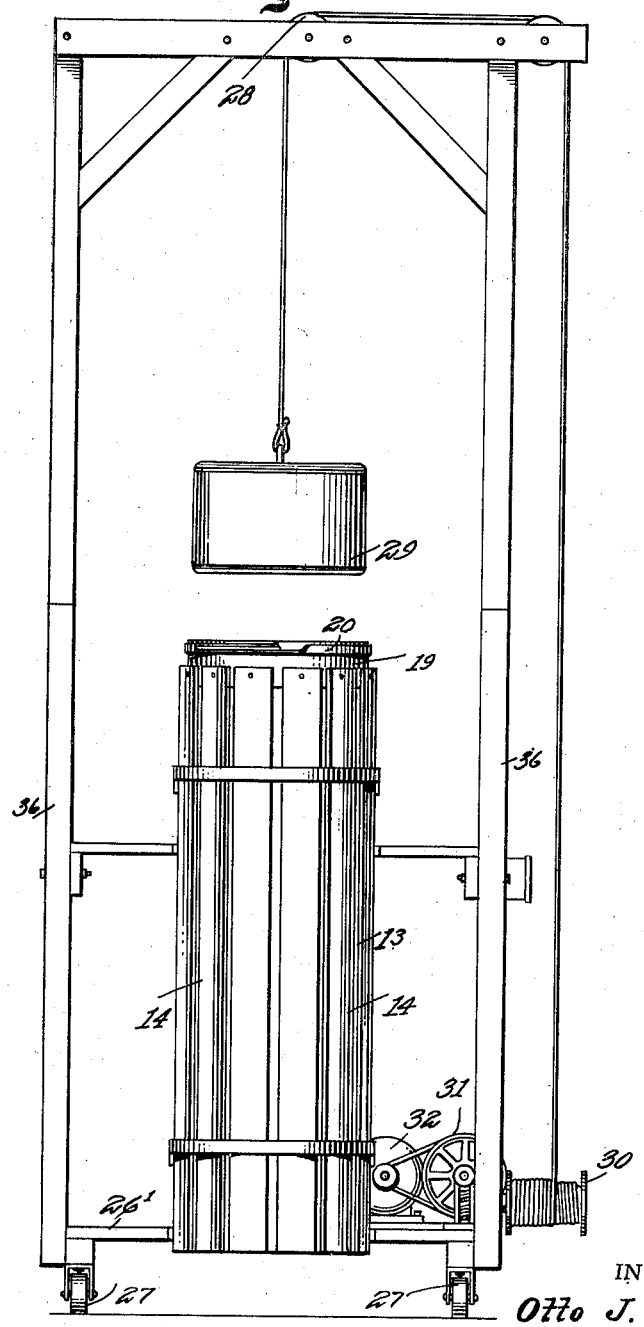

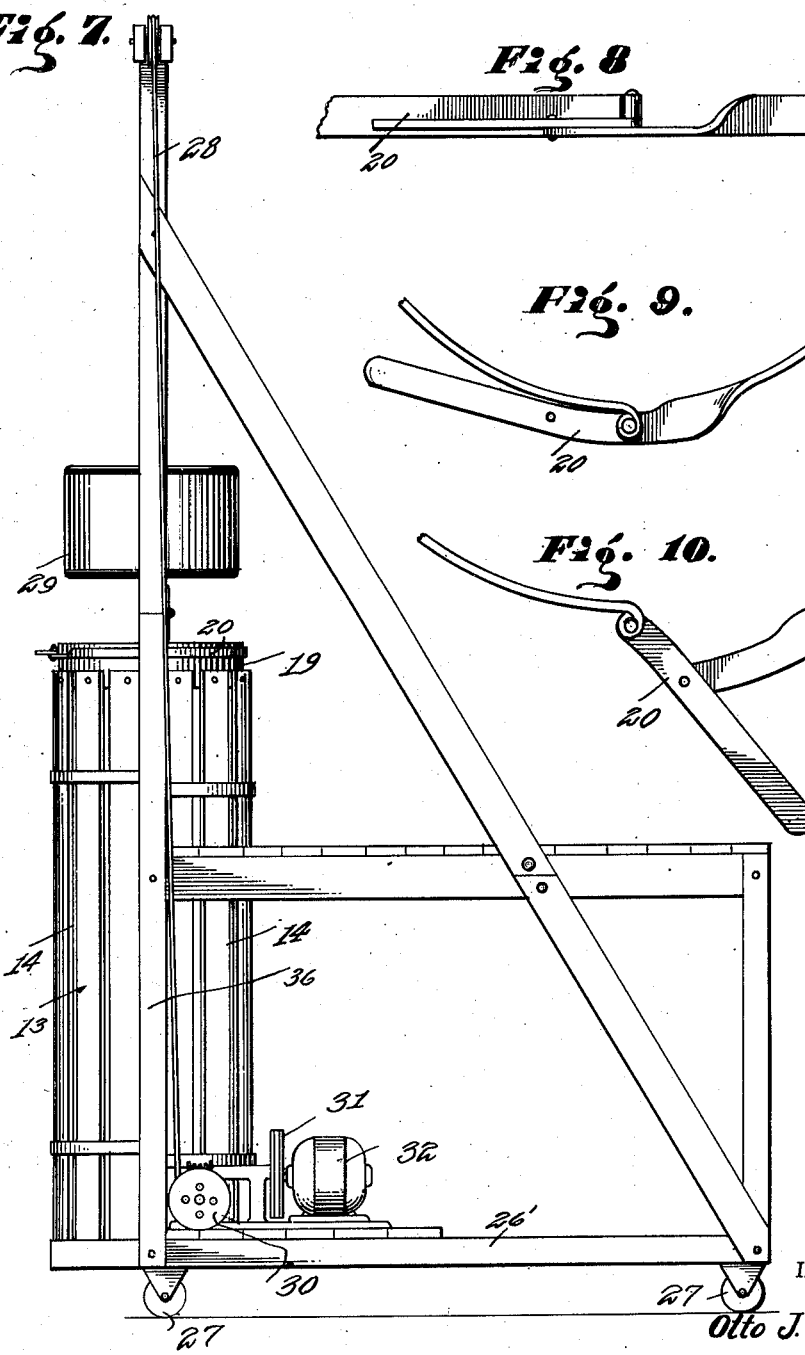

2,505,453

UNITED STATES PATENT OFFICE 2,505,453

WOOL SACKER

Otto J. Wolff, Rapid City, S. Dak.

Application March 28, 1946, Serial No. 657,676

1 Claim. (Cl. 226—19)

The invention relates to a bagging apparatus and more especially to fibre sackers.

The primary object of the invention is the provision of an apparatus of this character, wherein fibre materials, such as fleece, wool or other like materials, can be conveniently sacked, each sack being held in a novel manner for the filling thereof, irrespective of the shape of the same, and the material tampered therein, the apparatus being adaptable for transportation or plant erection.

Another object of the invention is the provision of an apparatus of this character, wherein the sack to be filled is held in a former, which can be opened and closed with ease and dispatch, the said former being readily accessible and such sack is releasably suspended within the former when the apparatus is in operation for sacking.

A further object of the invention is the provision of an apparatus of this character, wherein the filling of the sacks can be carried forth in a convenient manner, and the tampering of the material effected mechanically, the apparatus in its entirety being novel in construction and unique in the assembly of its parts for compactness of structure.

A still further object of the invention is the provision of an apparatus of this character, which is simple in construction, thoroughly reliable and efficient in operation, strong, durable, readily and easily operated with ease and dispatch, adapted for permanent location or portable from one locality to another, and inexpensive to manufacture and install.

With these and other objects in view the invention consists in the features of construction, combination and arrangement of parts as will be hereinafter more fully described, illustrated in the accompanying drawings, which disclose the preferred and modified forms of construction thereof, and pointed out in the claim hereunto appended.

In the accompanying drawings:

Figure 1 is an elevation, partly broken away, of the apparatus constructed in accordance with the invention.

Figure 1A is a fragmentary sectional view taken on the line 1A—1A of Figure 1 looking in the direction of the arrows;

Figure 2 is a side view of the apparatus;

Figure 3 is a fragmentary front elevation with the stand frame open and also the sack former open and a sack in the latter;

Figure 4 is a sectional view taken on the line 4—4 of Figure 1 looking in the direction of the arrows.

Figure 5 is a fragmentary perspective view looking toward the sack within the former therefor.

Figure 6 is an elevation of a modification of the apparatus;

Figure 7 is a side view thereof;

Figure 8 is a fragmentary side view of the sack clamp;

Figure 9 is a fragmentary plan view of the structure shown in Figure 8;

Figure 10 is a view similar to Figure 9 showing the clamp in open position;

Figure 11 is a side view of another modification, showing the apparatus in a working position;

Figure 12 is a view similar to Figure 11 showing the apparatus in position for transportation;

Figure 13 is a fragmentary elevation of a further modification;

Figure 14 is a view similar to Figure 13 of another modification;

Figure 15 is a view similar to Figure 13 showing a still further modification;

Figure 16 is a top plan view of a modified form of sack former.

Similar reference characters indicate corresponding parts throughout the several views in the drawings.

Referring to the drawings in detail, particularly Figures 1 to 5, inclusive, there is disclosed one conception of a sacking apparatus constituting the present invention, which comprises a stand frame designated generally at A, involving a horizontally disposed boarded platform 10 carrying sled-like underslung runners 11, supporting the frame A in a perpendicular position. Rising from the platform 10 are the latticed vertical side walls 12 which extend upwardly a uniform determined height with cross joists 12' capping the frame A at the top thereof, these joists being joined with the walls 12 in any selected manner to effect rigidity to such frame.

Centered within the frame A next to the front thereof is a vertically disposed sack former 13, in this instance of cylindrical shape, yet it may be of another cross-sectional contour, having horizontally swinging double doors 14, hinged at 15 for access to the interior of the former through the front of the frame A. The former 13 is held in a fixed position by vertical studdings 16 built in the walling thereof rising from the platform 10 to an upper floor 17 horizontally built in the frame A with the upper open end of the former 13 cleared therethrough.

Adapted to be suspended within the former 13 is a bag or sack 18, which has its upper open end portion removably fitted over a shaping hoop or ring 19, about which is overlapped this end portion of the bag or sack and fastened to this ring 19 by a clamping band 20, as best seen in Figure 3 of the drawings. This bag or sack 18 is thus suspended within the former 13 and when so located it is filled with fibre materials, such as fleece, wool or the like, as hereinafter described.

At the front of the frame A next to the former 13 is arranged a horizontally swingable outwardly bulged gate 21, its hinges being indicated at 22, while at 23 is a release latch for fastening the said gate closed. This gate 21 when opened gives access to the former 13 at the doors 14 thereof, which when opened allow of the removal of a filled bag or sack 18 from such former by hand.

The studdings 16 are extended upwardly close to the cross joists 12' capping the frame A and above the floor 17 to provide a runway and trackage 24 for a weighted movable tampering body 25 which in this instance is of barrel shape, yet it may be otherwise shaped, and such body is raised and lowered by a block pulley and cable 26 and 27, respectively hoisting assembly, the cable 27 being operated driven from any suitable source of driving power not shown. The body 25 when lowered in the runway 24 which leads to the former 13 tampers the material deposited within the bag or sack 18 confined in the former 13, the deposit of the material into such bag or sack being had from the floor 17 and can be hand or otherwise delivered.

In Figures 6 and 7 of the drawings there is shown a modification of the invention, wherein the stand frame 26 which is of the construction as shown, is supported on castor wheels 27, so that the apparatus is rendered portable while the block pulley and cable assembly 28 for raising and lowering the tampering element 29 is operated through the cable by a windlass 30 having driven connections 31 with an electric motor 32 of the rotary driving type and supported in the frame 26.

In Figures 11 and 12 of the drawings there is shown another modification of the invention, wherein the apparatus is rendered self-contained and mobile. In lieu of mounting the stand frame 26 on castor wheels 27, the frame can be supported for towing to a desired place of operation. As shown in Figures 11 and 12, the frame 33 of the apparatus carries running gear, including the traction wheels 34, and a trailer hitch 35 respectively. This frame 33 has a foldable crane assembly 36 for the cable of the hoisting assembly.

In lieu of the pulley arrangement of Figures 1 to 7, inclusive, for raising and lowering the tampering body 25 or 29, alternative forms of mechanical movements may be substituted. For example, as shown in Figure 13 of the drawings, which is a further modification of the invention, the tampering element 37 is driven by a feed screw 28, actuated by driving gearing 39.

In Figure 14 is shown another modification, wherein the tampering element 40 is operated by a telescopic hydraulically driven plunger 41. Then in Figure 15 of drawings, is shown an additional modification, wherein the tampering element 42 is driven by a toothed rack and pinion assembly 43 and 44 respectively.

In Figure 16 of the drawings there is shown a modified form of bag or sack former 45, this being only one example of a build thereof for use in the apparatus.

What is claimed is:

In a machine for filling sacks comprising in combination a supporting structure, a plurality of upright members extending from said supporting structure, an arcuate wall portion attached to and extending from each side of one of said upright members, complementary arcuate door portions pivotally mounted on said arcuate wall portions, respectively, said wall and door portions constituting a sack former, a substantially V-shaped gate pivotally attached to another of said upright members and adapted to engage said door portions for simultaneously closing the same on said arcuate wall portions, latch means on another of said upright members for releasably engaging said gate for holding the same, and thereby the door portions, locked, means on said wall and door portions for holding a sack suspended within the sack former whereby said sack can be filled with material, guide members above and aligned with said sack former, a tamping weight slidably received by said guide members whereby said weight is directed into the sack former for compressing the material within the sack and means carried by said supporting structure for lowering said weight into and withdrawing the same from said sack former.

OTTO J. WOLFF.

REFERENCES CITED

The following references are of record in the file of this patent:

UNITED STATES PATENTS

| Number | Name | Date |
|---|---|---|
| 591,260 | Koelner | Oct. 5, 1897 |
| 815,091 | Jones et al. | Mar. 13, 1906 |
| 865,107 | Kidwell | Sept. 3, 1907 |
| 1,003,006 | Maxwell | Sept. 12, 1911 |
| 1,547,335 | Lightfoot et al. | July 28, 1925 |
| 2,277,321 | Harris | Mar. 24, 1942 |